(12) United States Patent
Williams

(10) Patent No.: US 6,182,164 B1
(45) Date of Patent: Jan. 30, 2001

(54) MINIMIZING CACHE OVERHEAD BY STORING DATA FOR COMMUNICATIONS BETWEEN A PERIPHERAL DEVICE AND A HOST SYSTEM INTO SEPARATE LOCATIONS IN MEMORY

(75) Inventor: Robert A. Williams, Cupertino, CA (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/204,978

(22) Filed: Dec. 3, 1998

(51) Int. Cl.[7] ............................ G06F 13/10; G06F 13/14; G06F 13/20
(52) U.S. Cl. .......................... 710/15; 710/19; 710/52; 711/111; 711/118; 711/147
(58) Field of Search .................... 710/15, 19, 52; 711/111, 147, 118

(56) References Cited

U.S. PATENT DOCUMENTS

| | | | |
|---|---|---|---|
| 5,826,052 | * 10/1998 | Stiles et al. | 395/381 |
| 5,956,754 | * 9/1999 | Kimmel | 711/206 |
| 6,012,125 | * 1/2000 | Tran | 711/125 |
| 6,115,761 | * 9/2000 | Daniel et al. | 710/57 |

* cited by examiner

Primary Examiner—Thomas C. Lee
Assistant Examiner—Rehana Perveen
(74) Attorney, Agent, or Firm—Monica H. Choi

(57) ABSTRACT

A method and apparatus for storing, in a data storage device, status data and control data used for communications between a peripheral device and a host system with a mechanism for minimizing cache data processing overhead. The data storage device of the present invention includes a status portion, at a first location within the data storage device, for storing status data corresponding to a buffer. The first location of the data storage device corresponds to a first cache line, and the peripheral device generates the status data for providing status information to the host system. The data storage device further includes a control portion, at a second location within the data storage device, for storing control data corresponding to the descriptor. The second location of the data storage device corresponds to a second cache line, and the host system generates the control data for providing control information to the peripheral device. The host system reads the status information from cache and a cache controller transfers the status data from the data storage device to the cache for reading of the status data by the host system from the cache. With the present invention, the first cache line is different from the second cache line such that cache data processing overhead is minimized when coordinating access to the control data and the status data by the peripheral device and by the host system.

20 Claims, 3 Drawing Sheets

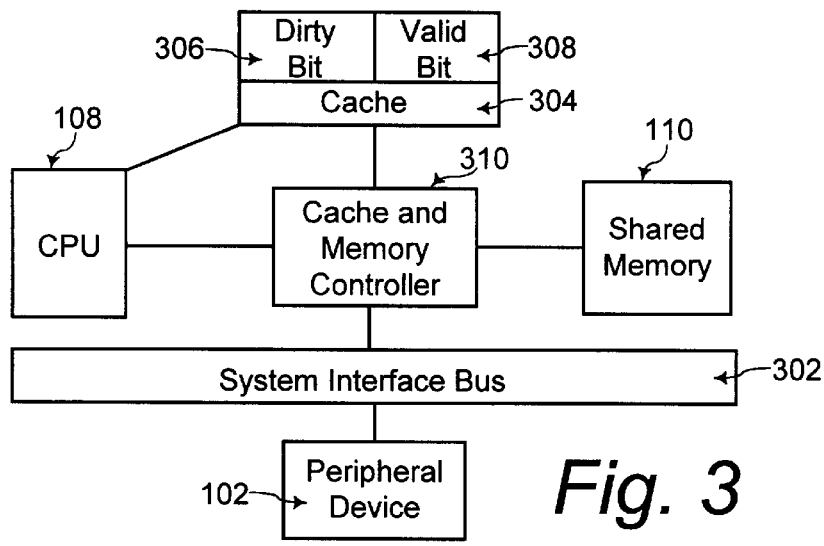

Fig. 3

| | |
|---|---|
| CPU Write of Control Data | If HIT, update cache line and mark cache line as dirty. |
| | If miss, write to memory. |
| CPU Read of Status Data | If HIT and INVALID, reload cache with cache line from memory before CPU reads status data from cache. |
| | If HIT and VALID, CPU reads status data from cache. |
| | If miss, fill cache with cache line from memory before CPU reads status data from cache. |
| Peripheral Device Write of Status Data | If HIT and cache line has not been modified, then invalidate cache line and write to memory. |
| | If HIT and cache line has been modified, then copy cache line to memory. Then, invalidate cache line and write new data to memory. |
| | If miss, write to memory. |
| Peripheral Device Read of Control Data | If HIT and cache line has been modified, then write cache line to memory and read from memory. |
| | If HIT and cache line has not been modified, then read from memory. |
| | If miss, then read from memory. |

Fig. 4 (Prior Art)

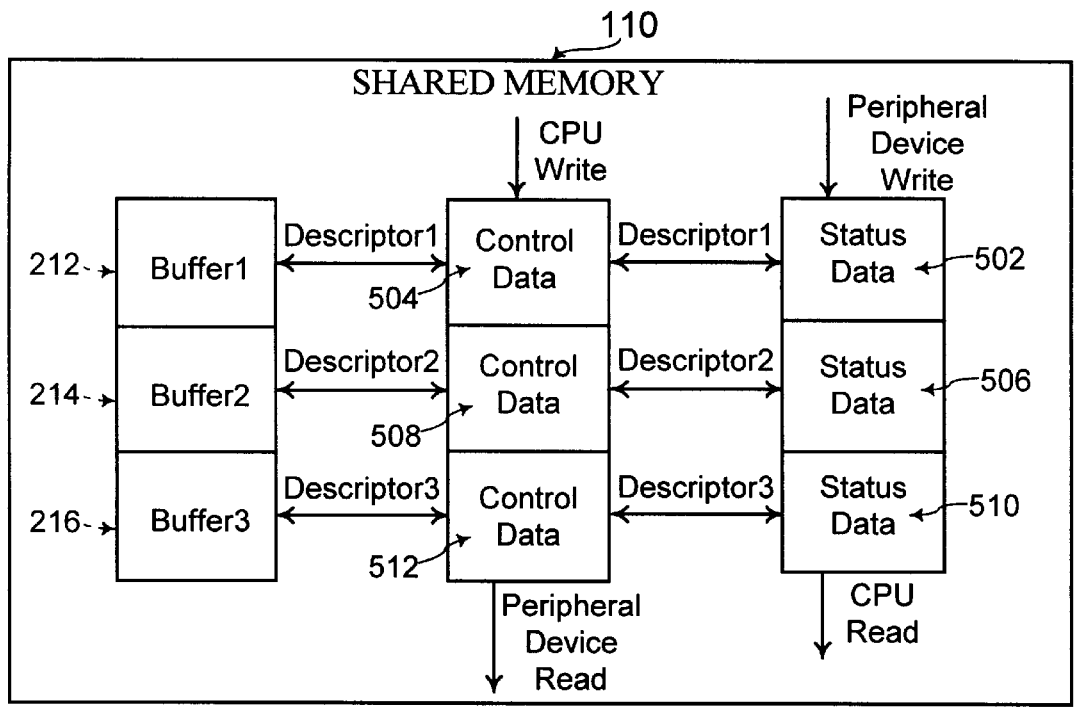

Fig. 5

| | |
|---|---|
| CPU Write of Control Data | Write control data to memory. |
| CPU Read of Status Data | If HIT and INVALID, reload cache with cache line from memory before CPU reads status data from cache. |
| | If HIT and VALID, CPU reads status data from cache. |
| | If miss, fill cache with cache line from memory before CPU reads status data from cache. |
| Peripheral Device Write of Status Data | If HIT, then invalidate cache line and write to memory. |
| | If miss, write to memory. |
| Peripheral Device Read of Control Data | Read from memory. |

Fig. 6

MINIMIZING CACHE OVERHEAD BY STORING DATA FOR COMMUNICATIONS BETWEEN A PERIPHERAL DEVICE AND A HOST SYSTEM INTO SEPARATE LOCATIONS IN MEMORY

TECHNICAL FIELD

This invention relates to interaction of a peripheral device with a host system, and more particularly to a method and apparatus for storing data used for communications between the peripheral device and the host system into separate locations in memory corresponding to different cache lines to minimize cache data processing overhead.

BACKGROUND OF THE INVENTION

The present invention will be described with an example application for an Ethernet computer network peripheral device which couples a host computer system to a network of computers. In this example application, a CPU of the host computer system and the Ethernet computer network peripheral device share access to a shared memory within the host computer system. In particular, the present invention is described with respect to a list of descriptors that are shared for access between the CPU and the computer network peripheral device as described herein. However, from this example application, it should be appreciated by one of ordinary skill in the art of electronic systems design that the present invention may be practiced for other computer peripheral devices that share access to a shared memory with the host computer system.

Referring to FIG. 1, a computer peripheral device 102 may be an Ethernet computer network peripheral device which allows a host computer 104 to communicate with other computers within a network of computers 106. Such a computer peripheral device 102 receives and transmits data packets on the network of computers 106. The computer peripheral device 102, which may be an Ethernet computer network peripheral device, receives and transmits data packets on the network of computers 106 in accordance with standard data communications protocols such as the IEEE 802.3 network standard or the DIX Ethernet standard as is commonly known to one of ordinary skill in the art of Ethernet computer network peripheral device design.

The host computer 104 may be a PC or a workstation, and has a host system which includes a CPU 108 and a shared memory 110 which may be any data storage device found in a PC or a workstation. The CPU 108 further processes a data packet received from the network of computers 106 or generates a data packet to be transmitted on the network of computers 106. The shared memory 110 is shared between the CPU 108 of the host system 104 and the computer network peripheral device 102. In a DMA (Direct Memory Access) mode of operation, the computer network peripheral device 102 has direct access to the shared memory 110 within the host system of the computer 104.

When the computer network peripheral device 102 receives a data packet from the network of computers 106, that data packet is written into the shared memory 110 directly by the computer network peripheral device 102 for further processing by the host system CPU 108. The CPU 108 also accesses the shared memory 110 to further process the data packet stored within the shared memory 110.

Alternatively, the CPU 108 accesses the shared memory 110 to write a data packet to be transmitted on the network of computers 106. The computer network peripheral device 102 then accesses the shared memory 110 to read the stored data packet in order to transmit such a data packet over the network of computers 106.

Since both the CPU 108 and the computer network peripheral device 102 access the shared memory 110, such shared access to the shared memory 110 is coordinated between the CPU 108 and the computer network peripheral device 102 for harmonious interaction between the two devices. Thus, referring to FIG. 2, the CPU 108 of the host system 104 and the computer peripheral device 102 share at least one buffer including a first buffer 212, a second buffer 214, and a third buffer 216 in the shared memory 110. A buffer may be used to store a data packet received or to be transmitted over the network of computers 106.

Access to the shared memory 110 between the CPU 108 and the computer network peripheral device 102 is coordinated by the use of descriptors. Referring to FIG. 2, a respective descriptor is within the shared memory 110 for each buffer within the shared memory 110. A first descriptor 222 corresponds to the first buffer 212, a second descriptor 224 corresponds to the second buffer 214, and a third descriptor 226 corresponds to the third buffer 216. Each descriptor has respective control data and respective status data corresponding to the respective buffer associated with that descriptor.

Thus, the first descriptor 222 has first control data 232 and first status data 242 corresponding to the first buffer 212. The second descriptor 224 has second control data 234 and second status data 244 corresponding to the second buffer 214. The third descriptor 226 has third control data 236 and third status data 246 corresponding to the third buffer 216.

In the prior art, the control data and the status data corresponding to a buffer are typically located in a same memory location. For example, the control data and the status data corresponding to a buffer may be located within a single byte within the shared memory 110.

The CPU 108 writes the control data corresponding to a buffer to communicate control information to the peripheral device 102, including for example the completion of processing by the CPU 108 data within the corresponding buffer. In that case, the peripheral device 102 reads the control data corresponding to a buffer to determine the completion of processing by the CPU 108 data within that corresponding buffer. On the other hand, the peripheral device 102 writes the status data corresponding to a buffer to communicate status information to the CPU 108, including for example the completion of processing by the peripheral device 102 data within the corresponding buffer. Thus, the CPU 108 reads the status data corresponding to a buffer to determine the completion of processing by the peripheral device 102 data within that corresponding buffer.

In the prior art, the control data and the status data of a descriptor are located closely together within the shared memory 110 such that the control data and the status data usually are in the same cache line within the shared memory 110. For example, the first control data 232 and the first status data 242 may be in a first cache line 252. The second control data 234 and the second status data 244 may be in a second cache line 254. The third control data 236 and the third status data 246 may be in a third cache line 256. Alternatively, more than one descriptor may be in any one cache line with the prior art.

The CPU 108 of the host system when reading data from the shared memory 110 caches data from memory before reading that data from cache. Because the CPU 108 operates in loops, data from memory is cached for faster speed when the CPU 108 repeatedly reads that data from cache. Referring to FIG. 3, the peripheral device 102 accesses data in the shared memory 110 via a system interface bus 302. The CPU 108 reads data in the shared memory 110 via a cache 304. The cache 304 includes a dirty bit 306 and a valid bit 308 as known to one of ordinary skill in the art of digital system design. A cache and memory controller 310 coordinates the availability of data from the shared memory 110 to the CPU 108 and to the peripheral device 102.

When the control data and the status data corresponding to a buffer are in the same cache line within shared memory 110, both the control data and the status data are loaded into cache 304 when any part of data corresponding to that cache line is loaded into cache 304. In that case, the coordination of the availability of data from the shared memory 110 to the CPU 108 and to the peripheral device 102 requires relatively high cache data processing overhead as illustrated in the table of FIG. 4 for a typical write-through cache system, as known to one of ordinary skill in the art.

Referring to the table of FIG. 4 and to FIGS. 2 and 3, if the CPU 108 requires writing control data to the shared memory 110, and if there is a cache hit (i.e., the cache line corresponding to that control data is already within the cache 304), then the cache and memory controller 310 updates that cache line within the cache 304. In that case also, the cache and memory controller 310 marks that cache line dirty via the dirty bit 306 to indicate that the content within the shared memory 110 corresponding to that cache line has been modified within the cache 304. Thus, the content within the shared memory 110 corresponding to that cache line should be updated to the current data that is within the cache 304. On the other hand, if the CPU 108 requires writing control data to the shared memory 110, and if there is a cache miss (i.e., there is no cache hit because the cache line corresponding to that control data is not within the cache 304), then the cache and memory controller 310 writes that control data from the CPU 108 to the corresponding location within the shared memory 110.

If the CPU 108 requires reading status data from the shared memory 110 and if there is a cache hit (i.e., the cache line corresponding to that status data is already within the cache 304) and if that cache line is invalid (i.e., the status data within the cache 304 is not current data as indicated by the valid bit 308), then the cache and memory controller 310 reloads the status data into the cache 304 from the shared memory 110. Thereafter, the CPU 108 reads that status data from the cache 304. If the CPU 108 requires reading status data from the shared memory 110 and if there is a cache hit (i.e., the cache line corresponding to that status data is already within the cache 304) and if that cache line is valid (i.e., the status data within the cache 304 is current data as indicated by the valid bit 308), then the CPU 108 simply reads that status data from the cache 304. If the CPU 108 requires reading status data from the shared memory 110 and if there is a cache miss (i.e., there is no cache hit because the cache line corresponding to that status data is not within the cache 304), then the cache and memory controller 310 loads the status data into the cache 304 from the shared memory 110. Thereafter, the CPU 108 reads that status data from the cache 304.

If the peripheral device 102 requires writing status data to the shared memory 110, and if there is a cache hit (i.e., the cache line corresponding to that status data is already within the cache 304) and if the cache line corresponding to that status data has not been modified within the cache 304 (as indicated by the dirty bit 306), then the peripheral device 102 writes that status data directly to the corresponding location within the shared memory 110. In addition, the cache and memory controller 310 invalidates that cache line via the valid bit 308 in the cache 304 to indicate that the status data within the cache 304 is not current data since that status data has been updated by the peripheral device 102 within the shared memory 110.

If the peripheral device 102 requires writing status data to the shared memory 110, and if there is a cache hit (i.e., the cache line corresponding to that status data is already within the cache 304) and if the cache line corresponding to that status data has been modified within the cache 304 (as indicated by the dirty bit 306), then the cache and memory controller 310 copies that cache line from the cache 304 into the shared memory 110. Thereafter, the cache and memory controller 310 writes that status data directly to the corresponding location within the shared memory 110. In addition, the cache and memory controller 310 invalidates that cache line via the valid bit 308 in the cache 304 to indicate that the status data within the cache 304 is not current data since that status data has been updated by the peripheral device 102 within the shared memory 110.

If the peripheral device 102 requires writing status data to the shared memory 110, and if there is a cache miss (i.e., there is no cache hit because the cache line corresponding to that status data is not within the cache 304), then the peripheral device 102 writes that status data directly to the corresponding location within the shared memory 110.

If the peripheral device 102 requires reading of control data from the shared memory 110, and if there is a cache hit (i.e., the cache line corresponding to that control data is already within the cache 304) and if the cache line corresponding to that control data has been modified within the cache 304 (as indicated by the dirty bit 306), then the cache and memory controller 310 writes that cache line from the cache 304 to the shared memory 110. Then, the peripheral device 102 reads that control data from the corresponding location within the shared memory 110 (via the system interface bus 302).

If the peripheral device 102 requires reading of control data from the shared memory 110, and if there is a cache hit (i.e., the cache line corresponding to that control data is already within the cache 304) and if the cache line corresponding to that control data has not been modified within the cache 304 (as indicated by the dirty bit 306), then the peripheral device 102 reads that control data from the corresponding location within the shared memory 110 (via the system interface bus 302).

If the peripheral device 102 requires reading of control data from the shared memory 110, and if there is a cache miss (i.e., there is no cache hit because the cache line corresponding to that control data is not within the cache 304), then the peripheral device 102 reads that control data from the corresponding location within the shared memory 110 (via the system interface bus 302).

As illustrated by the table of FIG. 4, relatively heavy cache data processing overhead is required to coordinate access to control data and status data that are on the same cache line for the cases of a cache hit and a cache miss according to the prior art. A mechanism to minimize cache data processing overhead during coordination of access to the shared memory 110 by the CPU 108 and the peripheral device 102 is desired for minimizing data processing overhead within the host system 104.

SUMMARY OF THE INVENTION

Accordingly, the present invention stores control data and status data within the shared memory such that cache data processing overhead is minimized.

In a general aspect, the present invention is an apparatus and method for storing, in a data storage device, status data and control data used for communications between a peripheral device and a CPU of a host system. The present invention includes a data storage device further including a status portion, at a first location within the data storage device, for storing status data corresponding to a buffer. The first location of the data storage device corresponds to a first cache line. The peripheral device generates the status data for providing status information to the host system. The data storage device further includes a control portion, at a second location within the data storage device, for storing control data corresponding to the buffer. The second location of the data storage device corresponds to a second cache line. The host system generates the control data for providing control information to the peripheral device. The host system reads the status information from cache, and a cache controller transfers status data to cache for reading of the status data by the host system from cache.

In addition, the first cache line is different from the second cache line, according to the present invention. Because the control data and the status data corresponding to a buffer are located in separate cache lines within the data storage device, cache data processing overhead is minimized with the present invention.

These and other features and advantages of the present invention will be better understood by considering the following detailed description of the invention which is presented with the attached drawings.

BRIEF DESCRIPTION OF THE DRAWINGS

FIG. 3 shows a cache memory system for coordinating access to the data storage device between the host system and the computer network peripheral device;

FIG. 4 shows a table of cache data processing overhead with the mechanism for storing control data and status data of FIG. 3, according to the prior art;

FIG. 5 shows a mechanism for storing control data and status data within the data storage device for minimizing cache data processing overhead, according to the present invention; and FIG. 6 shows a table of cache data processing overhead with the mechanism for storing control data and status data of FIG. 5, according to the present invention.

The figures referred to herein are drawn for clarity of illustration and are not necessarily drawn to scale. Elements having the same reference number in FIGS. 1–6 refer to elements having similar structure and function.

DETAILED DESCRIPTION

Figure 1:
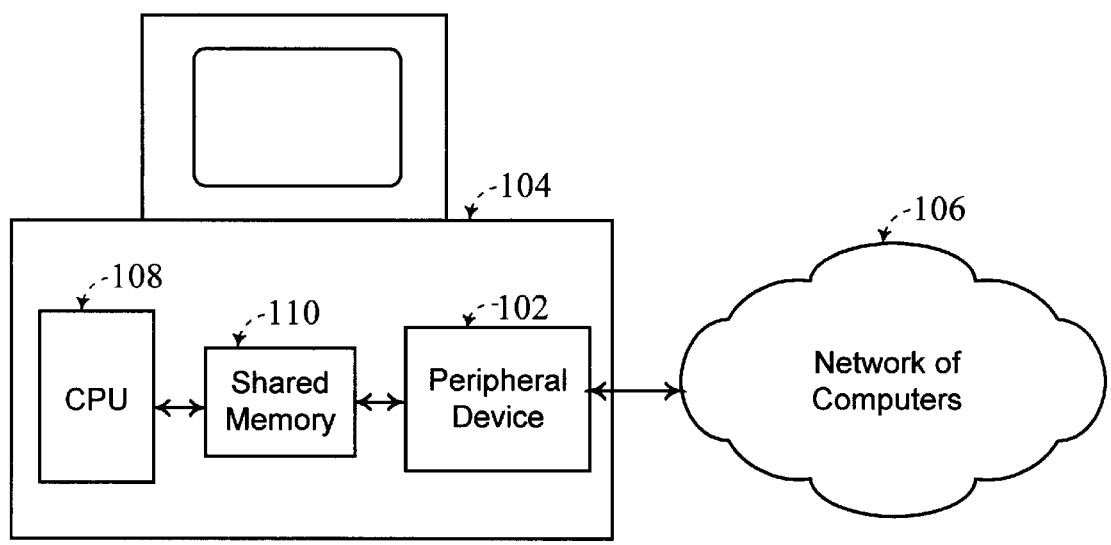
FIG. 1 shows a computer network peripheral device within a host system having a data storage device for communications between the host system and the computer network peripheral device.
Figure 2:
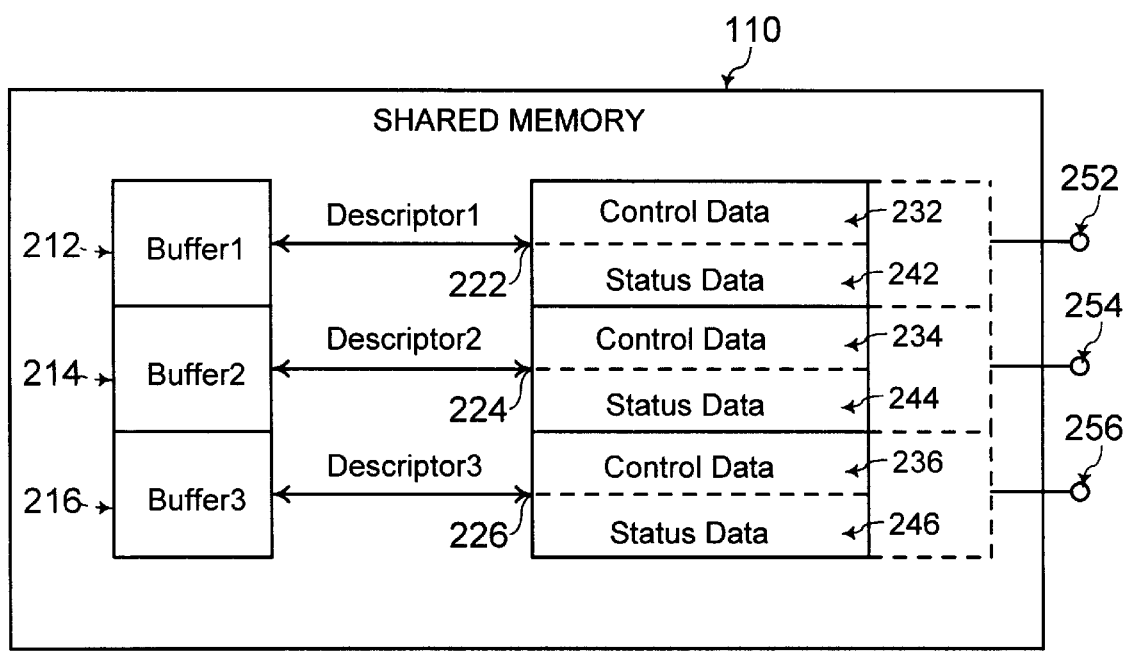
FIG. 2 shows a mechanism for storing control data and status data within the data storage device of FIG. 1 for communications between the host system and the computer network peripheral device, according to the prior art.

Referring to FIG. 5, the present invention is a mechanism for storing control data and status data within the shared memory 110 such that cache data processing overhead is minimized. More particularly, the control data and the status data corresponding to a buffer are stored in locations within the shared memory 110 corresponding to different cache lines to minimize cache data processing overhead.

Referring to FIG. 5, for the first descriptor corresponding to the first buffer 212 for example, the shared memory 110 includes a first status portion 502 at a first location within the shared memory 110 for storing status data corresponding to the first descriptor. The shared memory 110 includes a first control portion 504 at a second location within the shared memory 110 for storing control data corresponding to the first descriptor.

Similarly, the shared memory 110 includes a second status portion 506 at a third location within the shared memory for storing status data corresponding to the second descriptor. The shared memory 110 includes a second control portion 508 at a fourth location within the shared memory 110 for storing control data corresponding to the second descriptor. The shared memory 110 includes a third status portion 510 at a fifth location within the shared memory 110 for storing status data corresponding to the third descriptor. The shared memory 110 includes a third control portion 512 at a sixth location within the shared memory 110 for storing control data corresponding to the third descriptor.

The CPU 108 of the host system 104 generates the control data to be stored in the control portions 504, 508, and 512 for providing control information to the peripheral device 102, including for example the completion of processing by the CPU 108 of the data within the buffers. The peripheral device 102 reads from any of the control portions 504, 508, and 512 to determine the completion of processing by the CPU 108 of the data within a corresponding buffer.

The peripheral device 102 generates the status data to be stored in the status portions 502, 506, and 510 for providing status information to the CPU 108 of the host system 104, including for example the completion of processing by the peripheral device 102 of the data within the buffers. The CPU 108 reads from any of the status portions 502, 506, and 510 to determine the completion of processing by the peripheral device 102 of the data within a corresponding buffer. Referring to FIG. 3, the cache and memory controller 310 typically loads the status data into the cache 304 from the shared memory 110 before the CPU 108 reads the status data from the cache 304.

According to the present invention, the locations of the status portion and the control portion corresponding to a buffer are on different cache lines. Referring to FIG. 5, the first location of the first status portion 502 corresponds to a first cache line, and the second location of the first control portion 504 corresponds to a second cache line. The first cache line and the second cache line are different such that the status data within the first status portion 502 and the control data within the first control portion 504 are not together loaded into the cache 304 in FIG. 3.

Similarly, the third location of the second status portion 506 corresponds to a third cache line, and the fourth location of the second control portion 508 corresponds to a fourth cache line. The third cache line and the fourth cache line are different such that the status data within the second status portion 506 and the control data within the second control portion 508 are not together loaded into the cache 304 in FIG. 3. The fifth location of the third status portion 510 corresponds to a fifth cache line, and the sixth location of the third control portion 512 corresponds to a sixth cache line. The fifth cache line and the sixth cache line are different such that the status data within the third status portion 510 and the control data within the third control portion 512 are not together loaded into the cache 304 in FIG. 3.

Furthermore, note that a plurality of status portions may be located in any one cache line, and a plurality of control portions may be located in any one cache line. However, with the present invention, any one cache line does not include both a status portion and a control portion corresponding to a buffer.

The peripheral device 102 and a peripheral device driver within the CPU 108, during initialization of the host system 104, configure the shared memory 110 to maintain the status portion and the control portion corresponding to a buffer to be in different cache lines. For example, the peripheral device 102 may generate a first descriptor list of control portions and a second descriptor list of status portions for a list of buffers within the shared memory. The CPU 108, during initialization of the host system 104 specifies a first starting memory location within the shared memory 110 for the first descriptor list and a second starting memory location within the shared memory 110 for the second descriptor list. The control portions within the first descriptor list are stored sequentially within the shared memory 110 starting from the first starting memory location. The status portions within the second descriptor list are stored sequentially within the shared memory 110 starting from the second starting memory location. The CPU 108 specifies the first starting memory location and the second starting memory location such that the control portion and status portion corresponding to a buffer are in different cache lines.

In this manner, the control data and the status data corresponding to a buffer are not loaded into the cache 304 at the same time. Thus, cache data processing overhead is minimized as illustrated in the table of FIG. 6.

Referring to the table of FIG. 6 and to FIGS. 3 and 5, if the CPU 108 requires writing control data to the shared memory 110, then the CPU 108 simply writes that control data to the corresponding location within the shared memory 110. On the other hand, if the peripheral device 102 requires reading control data from the shared memory 110, then the peripheral device 102 simply reads that control data from the corresponding location within the shared memory 110. Since control data is written by the CPU 108 and read by the peripheral device 102 and since control data is on a cache line that is different from the cache line of status data according to the present invention, control data is not loaded into the cache 304. The cache 304 is not used for handling of the control data with the present invention. Thus, cache data processing is not needed for coordinating access to control data within the shared memory 110, and cache data processing is thus further minimized with the present invention.

In addition, if the CPU 108 requires reading status data from the shared memory 110 and if there is a cache hit (i.e., the cache line corresponding to that status data is already within the cache 304) and if that cache line is invalid (i.e., the status data within the cache 304 is not current data as indicated by the valid bit 308), then the cache controller 310 loads the status data into the cache 304 from the shared memory 110. Thereafter, the CPU 108 reads that status data from the cache 304. If the CPU 108 requires reading status data from the shared memory 110 and if there is a cache hit (i.e., the cache line corresponding to that status data is already within the cache 304) and if that cache line is valid (i.e., the status data within the cache 304 is current data as indicated by the valid bit 308), then the CPU 108 simply reads that status data from the cache 304. If the CPU 108 requires reading status data from the shared memory 110 and if there is a cache miss (i.e., there is no cache hit because the cache line corresponding to that status data is not within the cache 304), then the cache controller 310 loads the status data into the cache 304 from the shared memory 110. Thereafter, the CPU 108 reads that status data from the cache 304.

On the other hand, if the peripheral device 102 requires writing status data to the shared memory 110 and if there is a cache hit (i.e., the cache line corresponding to that status data is already within the cache 304), then the peripheral device 102 writes that status data directly to the corresponding location within the shared memory 110. In addition, the cache and memory controller 310 invalidates that cache line via the valid bit 308 in the cache 304 to indicate that the status data within the cache 304 is not current data since that status data has been updated by the peripheral device 102 within the shared memory 110. If the peripheral device 102 requires writing status data to the shared memory 110 and if there is a cache miss (i.e., there is no cache hit because the cache line corresponding to that status data is not within the cache 304), then the peripheral device 102 writes that status data directly to the corresponding location within the shared memory 110.

In this manner, status data is loaded into the cache 304 for reading of the status data by the CPU 108. However, because control data is on a cache line that is different from the cache line of status data according to the present invention, control data is not modified within the cache 304 before the peripheral device 102 requires reading of that control data from the shared memory 110. Thus, the content of the cache 304 is not first copied to the shared memory 110 before the peripheral device 102 reads that control data from the shared memory 110. In effect, the dirty bit 306 within the cache 304 is not used according to the present invention. Because the dirty bit 306 within the cache 304 does not need processing according to the present invention, cache data processing overhead is thus further minimized with the present invention.

The foregoing is by way of example only and is not intended to be limiting. For example, the present invention may be used for any number of buffers within the shared memory 110. In addition, the present invention may be practiced for any type of computer peripheral device aside from just the example of the computer network peripheral device. The present invention may also be practiced for any type of data storage device located either within the host system 104 or on the peripheral device 102 for storing control data and status data, as known to one of ordinary skill in the art. The invention is limited only as defined in the following claims and equivalents thereof.

I claim:

1. A method for storing, in a data storage device, status data and control data used for communications between a peripheral device and a host system, the method including the steps of:

A. storing status data, corresponding to a buffer, in a first location of the data storage device, wherein said first location of said data storage device corresponds to a first cache line, and wherein said peripheral device generates said status data for providing status information to said host system;

B. storing control data, corresponding to said descriptor, in a second location of the data storage device, wherein said second location of said data storage device corresponds to a second cache line, and wherein said host system generates said control data for providing control information to said peripheral device; and C. maintaining said first cache line to be different from said second cache line, and wherein said host system reads said status information from cache.

2. The method of claim 1, wherein said host system writes said control data to said second location of said data storage device.

3. The method of claim 1, wherein said peripheral device reads said control data from said second location of said data storage device.

4. The method of claim 1, wherein said host system reads said status data from said cache if the first cache line is a hit within said cache and if the first cache line is valid within said cache.

5. The method of claim 1, wherein said status data is reloaded from said first location of said data storage device into said cache before said host system reads said status data from said cache if the first cache line is a hit within said cache and if the first cache line is invalid within said cache.

6. The method of claim 1, wherein said status data is loaded from said first location of said data storage device into said cache before said host system reads said status data from said cache if the first cache line is not a hit within said cache.

7. The method of claim 1, wherein said peripheral device writes said status data to said first location of said data storage device.

8. The method of claim 7, wherein the first cache line is invalidated within said cache if the first cache line is a hit within said cache when said peripheral device writes said status data to said first location.

9. The method of claim 1, wherein said peripheral device is a computer network peripheral device that couples a host computer system to a network of computers, and wherein said descriptor corresponds to a buffer in said data storage device for storing a data packet.

10. A method for storing, in a data storage device, status data and control data used for communications between a computer network peripheral device and a host computer system, the method including the steps of:

A. storing status data, corresponding to a buffer, in a first location of the data storage device, wherein said first location of said data storage device corresponds to a first cache line, and wherein said computer network peripheral device generates said status data for providing status information to said host computer system, and wherein said descriptor corresponds to a buffer in said data storage device for storing a data packet;

B. storing control data, corresponding to said descriptor, in a second location of the data storage device, wherein said second location of said data storage device corresponds to a second cache line, and wherein said host computer system generates said control data for providing control information to said computer network peripheral device; and C. maintaining said first cache line to be different from said second cache line;

and wherein said host computer system reads said status information from cache;

and wherein said host computer system writes said control data to said second location of said data storage device;

and wherein said computer network peripheral device reads said control data from said second location of said data storage device;

and wherein said host computer system reads said status data from said cache if the first cache line is a hit within said cache and if the first cache line is valid within said cache;

and wherein said status data is reloaded from said first location of said data storage device into said cache before said host computer system reads said status data from said cache if the first cache line is a hit within said cache and if the first cache line is invalid within said cache;

and wherein said status data is loaded from said first location of said data storage device into said cache before said host computer system reads said status data from said cache if the first cache line is not a hit within said cache;

and wherein said computer network peripheral device writes said status data to said first location of said data storage device, and wherein the first cache line is invalidated within said cache if the first cache line is a hit within said cache when said computer network peripheral device writes said status data to said first location.

11. An apparatus for coordinating communications between a peripheral device and a host system, the apparatus comprising:

a data storage device further including:
   a status portion, at a first location within said data storage device, for storing status data corresponding to a buffer, wherein said first location of said data storage device corresponds to a first cache line, and wherein said peripheral device generates said status data for providing status information to said host system; and
   a control portion, at a second location within said data storage device, for storing control data corresponding to said descriptor, wherein said second location of said data storage device corresponds to a second cache line, and wherein said host system generates said control data for providing control information to said peripheral device;

means for maintaining said first cache line to be different from said second cache line;

and wherein said host system reads said status information from cache, and a cache controller for transferring said status data to said cache for reading of said status data by said host system from said cache.

12. The apparatus of claim 11, wherein said host system writes said control data to said second location of said data storage device.

13. The apparatus of claim 11, wherein said peripheral device reads said control data from said second location of said data storage device.

14. The apparatus of claim 11, wherein said host system reads said status data from said cache if the first cache line is a hit within said cache and if the first cache line is valid within said cache.

15. The apparatus of claim 11, wherein said cache controller reloads said status data from said first location of said data storage device into said cache before said host system reads said status data from said cache if the first cache line is a hit within said cache and if the first cache line is invalid within said cache.

16. The apparatus of claim 11, wherein said cache controller loads status data from said first location of said data storage device into said cache before said host system reads said status data from said cache if the first cache line is not a hit within said cache.

17. The apparatus of claim 11, wherein said peripheral device writes said status data to said first location of said data storage device.

18. The apparatus of claim 17, wherein the first cache line is invalidated within said cache if the first cache line is a hit within said cache when said peripheral device writes said status data to said first location.

19. The apparatus of claim 18, wherein said peripheral device is a computer network peripheral device that couples a host computer system to a network of computers, and wherein said descriptor corresponds to a buffer in said data storage device for storing a data packet.

20. An apparatus for coordinating communications between a peripheral device and a host system, the apparatus comprising:

- a data storage device further including:
  - a status portion, at a first location within said data storage device, for storing status data corresponding to a buffer, wherein said first location of said data storage device corresponds to a first cache line, and wherein said peripheral device generates said status data for providing status information to said host system; and
  - a control portion, as a second location within said data storage device, for storing control data corresponding to said descriptor, wherein said second location of said data storage device corresponds to a second cache line, and wherein said host system generates said control data for providing control information to said peripheral device,
- means for maintaining said first cache line to be different from said second cache line;
- and wherein said host system reads said status information from cache, and
- a cache controller for transferring said status data to said cache for reading of said status data by said host system from said cache;
- and wherein said host computer system writes said control data to said second location of said data storage device;
- and wherein said computer network peripheral device reads said control data from said second location of said data storage device;
- and wherein said host computer system reads said status data from said cache if the first cache line is a hit within said cache and if the first cache line is valid within said cache;
- and wherein said status data is reloaded from said first location of said data storage device into said cache before said host computer system reads said status data from said cache if the first cache line is a hit within said cache and if the first cache line is invalid within said cache;
- and wherein said status data is loaded from said first location of said data storage device into said cache before said host computer system reads said status data from said cache if the first cache line is not a hit within said cache;
- and wherein said computer network peripheral device writes said status data to said first location of said data storage device, and wherein the first cache line is invalidated within said cache if the first cache line is a hit within said cache when said computer network peripheral device writes said status data to said first location.

* * * * *